(12) United States Patent
Drummer

(10) Patent No.: US 12,460,761 B1
(45) Date of Patent: Nov. 4, 2025

(54) PIPE-TAPPING SYSTEM

(71) Applicant: Ronald Drummer, Altamonte Spring, FL (US)

(72) Inventor: Ronald Drummer, Altamonte Spring, FL (US)

( * ) Notice: Subject to any disclaimer, the term of this patent is extended or adjusted under 35 U.S.C. 154(b) by 57 days.

(21) Appl. No.: 18/515,500

(22) Filed: Nov. 21, 2023

(51) Int. Cl.
*F16L 41/04* (2006.01)

(52) U.S. Cl.
CPC .................................. *F16L 41/04* (2013.01)

(58) Field of Classification Search
CPC ......... F16L 41/04; F16L 41/06; F16L 41/082; F16L 47/28; F16L 47/34; Y10T 137/0458; Y10T 137/612
See application file for complete search history.

(56) References Cited

U.S. PATENT DOCUMENTS

| | | |
|---|---|---|
| 4,966,397 A | 10/1990 | McKinnon |
| 5,553,898 A | 9/1996 | Rogers, Jr. |
| D561,304 S | 2/2008 | Vansell |
| 9,938,680 B2 | 4/2018 | Smith |
| 10,502,355 B2 | 12/2019 | Weber |
| 11,009,168 B2 | 5/2021 | Shin |
| 2007/0200341 A1 | 8/2007 | Veronneau |
| 2015/0300548 A1 | 10/2015 | Korte |

FOREIGN PATENT DOCUMENTS

| | | | | |
|---|---|---|---|---|
| CH | 350512 A | * | 11/1960 | |
| DE | 20120029 U1 | * | 4/2003 | ............ B21D 39/06 |
| DE | 202012103586 U1 | * | 12/2012 | .............. F16L 41/06 |
| EP | 3540356 A1 | * | 9/2019 | ........... B21C 37/296 |
| GB | 1057179 A | * | 6/1913 | |
| GB | 191219440 A | * | 2/1967 | |
| WO | 2016081877 | | 5/2016 | |

OTHER PUBLICATIONS

Machine English translation of CH350512 (Year: 2025).*
Machine English translation of DE20120029 (Year: 2025).*
Machine English translation of DE202012103586 (Year: 2025).*

* cited by examiner

*Primary Examiner* — Hailey K. Do
(74) *Attorney, Agent, or Firm* — Kyle A. Fletcher, Esq.

(57) ABSTRACT

The pipe-tapping system is an aftermarket structure configured for use with an existing piping network. The pipe-tapping system allows for the formation of a fluidic connection between a pipe that needs to be added into the existing piping network and the existing piping network itself. The pipe-tapping system allows for the addition of the pipe that needs to be added into the existing piping network without requiring the bifurcation of a pipe selected from the existing piping network. The pipe-tapping system includes a fitting structure, a plurality of pipe structures, and a seal structure. The fitting structure forms the fluidic connections between the plurality of pipe structures. The seal structure forms fluid impermeable seals between the fitting structure and the plurality of pipe structures.

14 Claims, 4 Drawing Sheets

PIPE-TAPPING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of joining branching pipes. (F16L41/00)

SUMMARY OF INVENTION

The pipe-tapping system is an aftermarket structure. The pipe-tapping system is configured for use with an existing piping network. The pipe-tapping system is a fitting. The pipe-tapping system allows for the formation of a fluidic connection between a pipe that needs to be added into the existing piping network and the existing piping network itself. The pipe-tapping system allows for the addition of the pipe that needs to be added into the existing piping network without requiring the bifurcation of a pipe selected from the existing piping network. The pipe-tapping system comprises a fitting structure, a plurality of pipe structures, and a seal structure. The fitting structure forms the fluidic connections between the plurality of pipe structures. The seal structure forms fluid impermeable seals between the fitting structure and the plurality of pipe structures.

These together with additional objects, features and advantages of the pipe-tapping system will be readily apparent to those of ordinary skill in the art upon reading the following detailed description of the presently preferred, but nonetheless illustrative, embodiments when taken in conjunction with the accompanying drawings.

In this respect, before explaining the current embodiments of the pipe-tapping system in detail, it is to be understood that the pipe-tapping system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pipe-tapping system.

It is therefore important that the claims be regarded as including such equivalent construction insofar as they do not depart from the spirit and scope of the pipe-tapping system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 2:
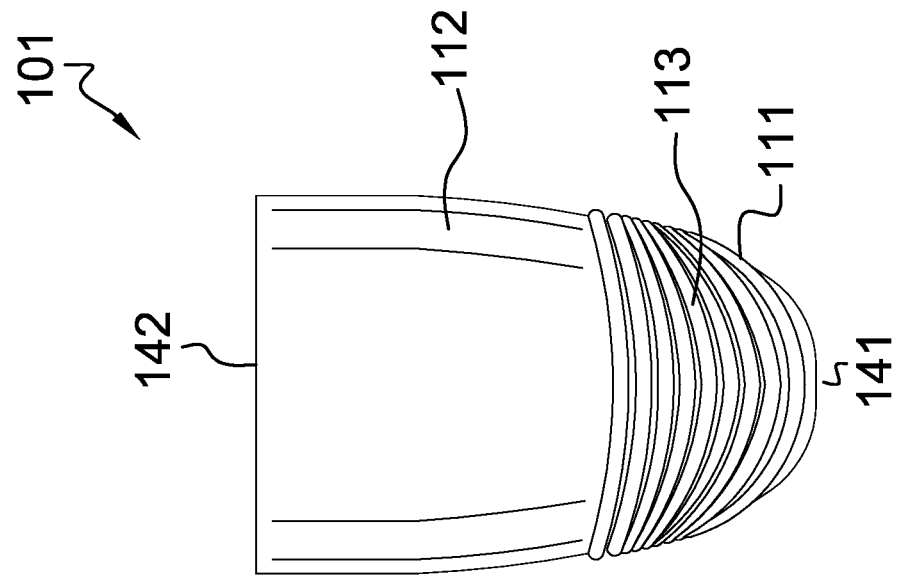
FIG. 2 is a side view of an embodiment of the disclosure.
Figure 1:
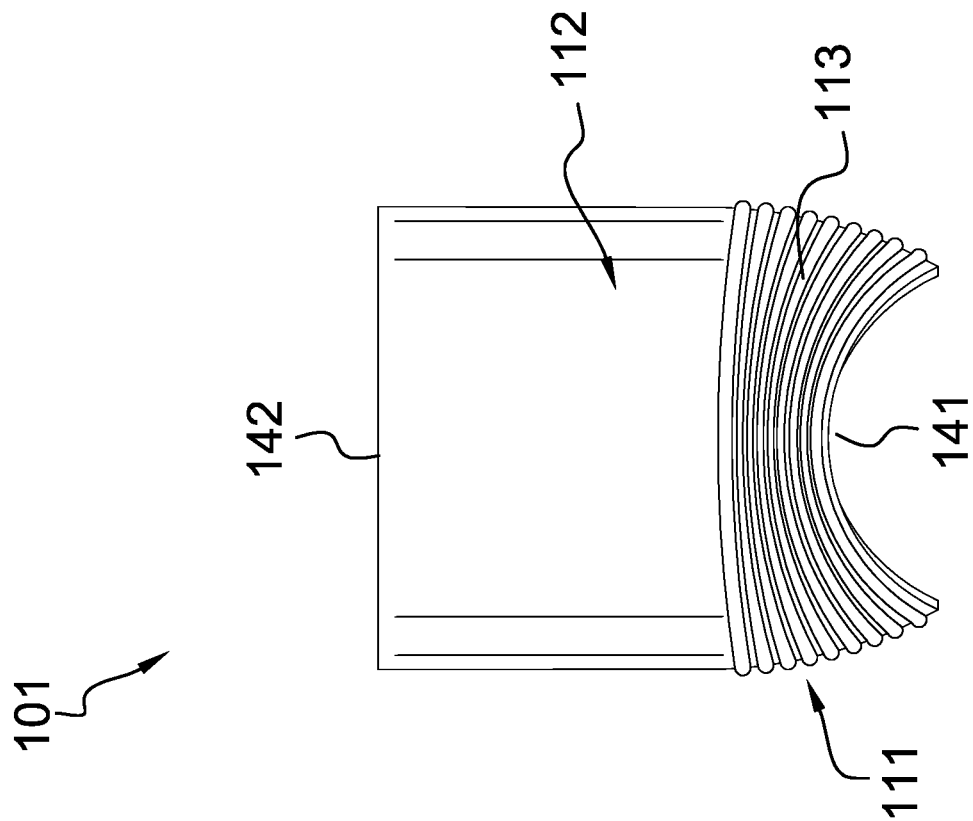
FIG. 1 is a front view of an embodiment of the disclosure.
Figure 4:
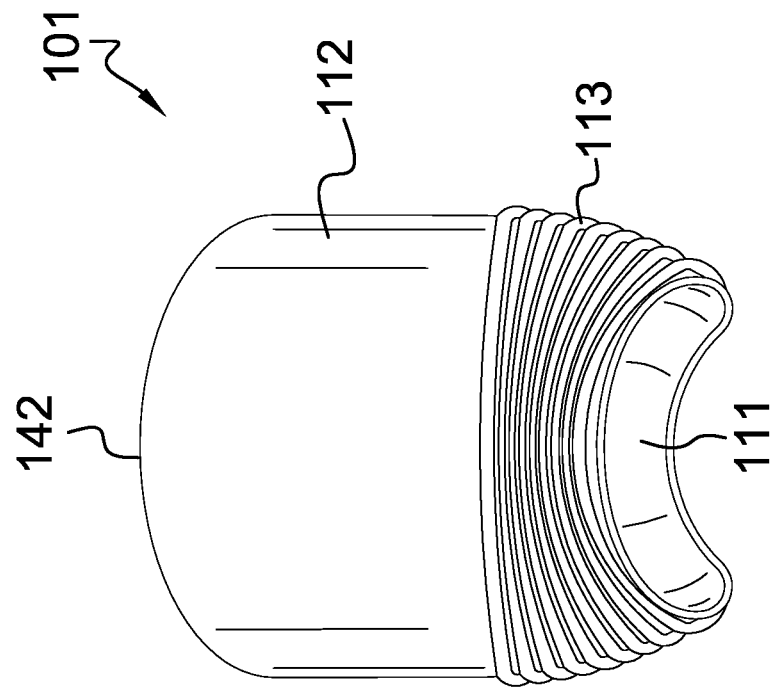
FIG. 4 is a perspective view of an embodiment of the disclosure.
Figure 3:
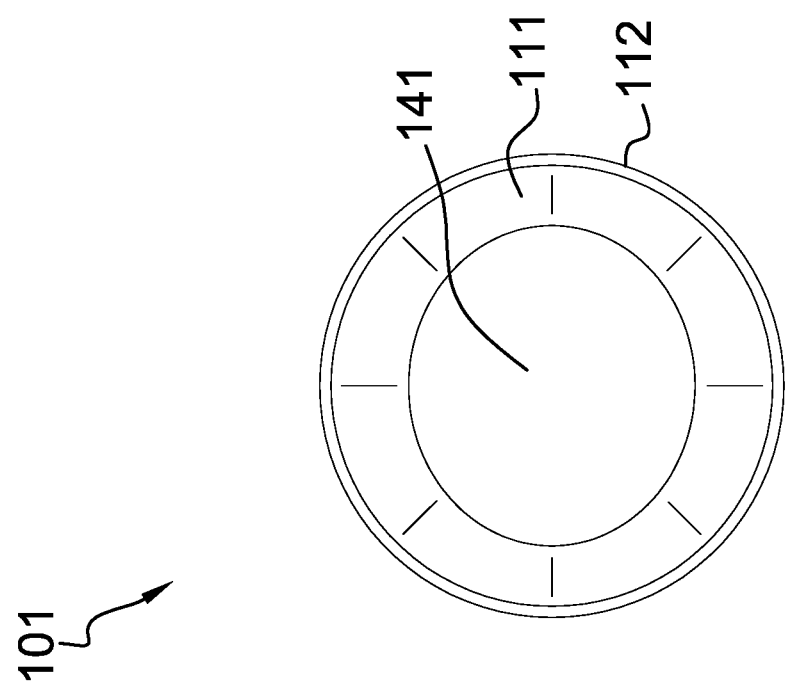
FIG. 3 is a top view of an embodiment of the disclosure.
Figure 5:
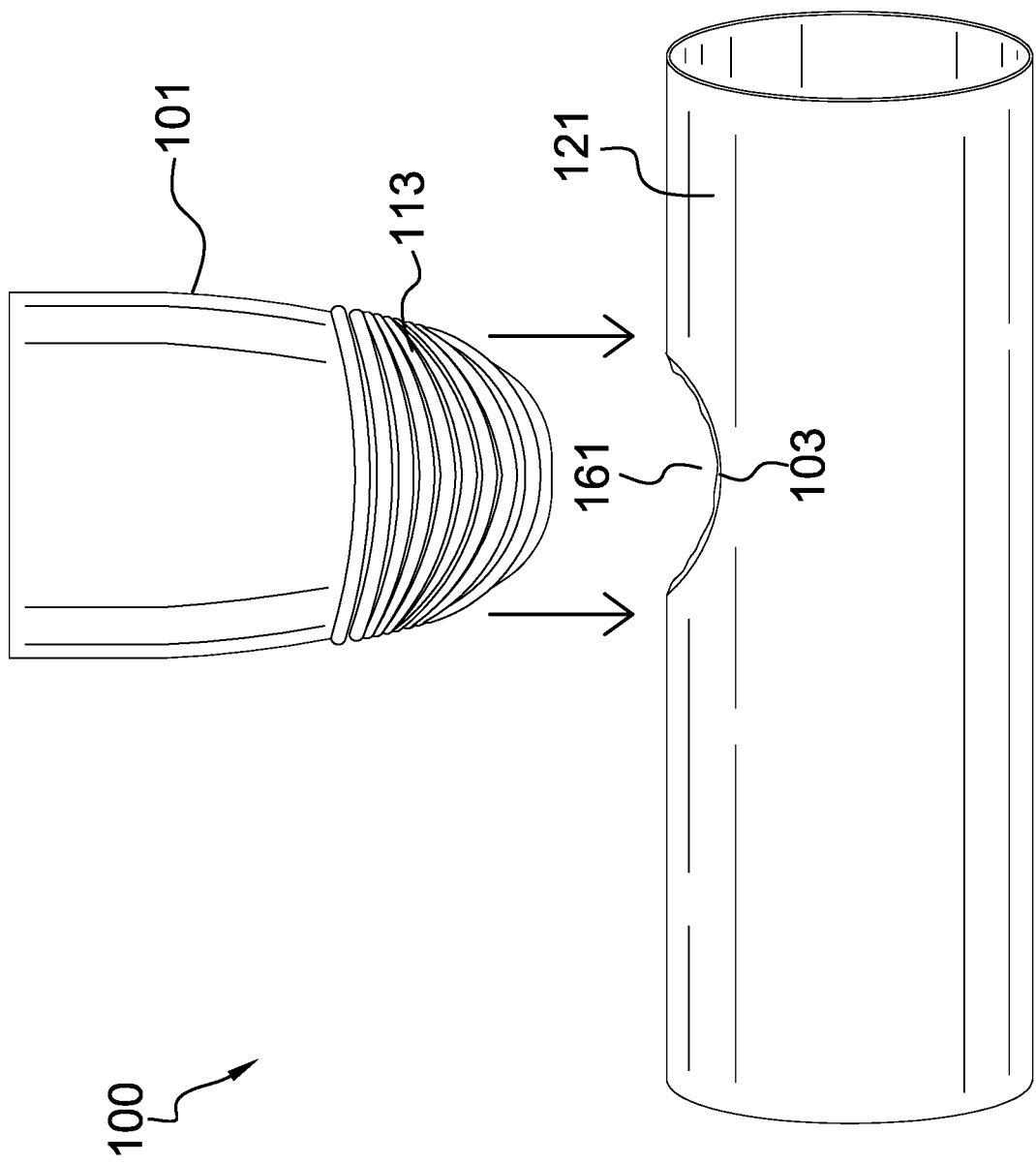
FIG. 5 is an in-use view of an embodiment of the disclosure.
Figure 6:
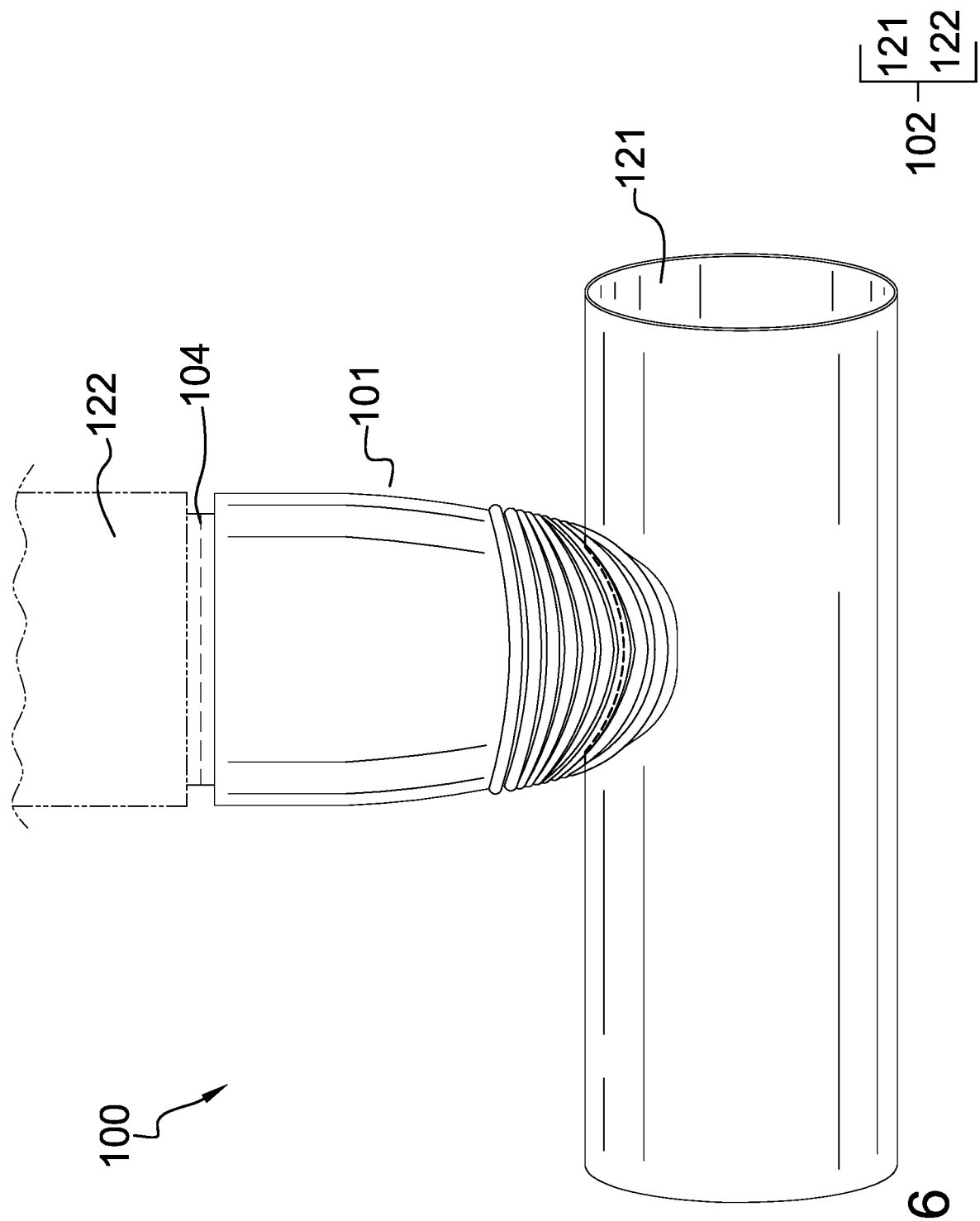
FIG. 6 is an in-use view of an embodiment of the disclosure.

Detailed reference will now be made to one or more potential embodiments of the disclosure, which are illustrated in FIGS. 1 through 6.

The pipe-tapping system 100 (hereinafter invention) is an aftermarket structure. The invention 100 is configured for use with an existing piping network. The invention 100 is a fitting. The invention 100 allows for the formation of a fluidic connection between a pipe that needs to be added into the existing piping network and the existing piping network itself. The invention 100 allows for the addition of the pipe that needs to be added into the existing piping network without requiring the bifurcation of a pipe selected from the existing piping network. The invention 100 comprises a fitting structure 101, a plurality of pipe structures 102, a seal structure 103, and a threaded connection 104. The fitting structure 101 forms the fluidic connections between the plurality of pipe structures 102. The seal structure 103 forms fluid impermeable seals between the fitting structure 101 and the plurality of pipe structures 102. The threaded connection 104 forms a physical fluidic connection between the fitting structure 101 and the plurality of pipe structures 102.

Each pipe structure selected from the plurality of pipe structures 102 is a pipe. Each pipe structure selected from the plurality of pipe structures 102 is a fluid transport structure. The plurality of pipe structures 102 comprises the specific pipes that are to be fluidically connected by the fitting structure 101. The plurality of pipe structures 102 comprises a first pipe structure 121 and a second pipe structure 122.

The first pipe structure 121 is a pipe selected from the existing piping network. The first pipe structure 121 is the pipe that is selected for the fluidic connection with the second pipe structure 122. The second pipe structure 122 is a pipe selected from the existing piping network. The second pipe structure 122 is the pipe that is selected for the fluidic connection with the first pipe structure 121.

The fitting structure 101 is a pipe. The fitting structure 101 is a fitting. The fitting structure 101 forms a fluidic connection between the first pipe structure 121 and the second pipe structure 122. The fitting structure 101 has a composite prism structure. The fitting structure 101 is a hollow structure. The fitting structure 101 comprises a tapered insert 111, a fitting end 112, a first open end 141, and a second open end 142. The fitting structure 101 is formed as a single fluid transport structure. The tapered insert 111 forms a section of the fitting structure 101. The fitting end 112 forms the balance of the fitting structure 101.

The tapered insert 111 is a pipe. The tapered insert 111 has a tapered prism structure. The tapered insert 111 is a fluid transport structure. The tapered insert 111 is a hollow structure. The tapered insert 111 transports fluid between the fitting end 112 of the fitting structure 101 and the first pipe structure 121.

The fitting end 112 is a pipe. The fitting end 112 is a fluid transport structure. The fitting end 112 is a hollow structure. The fitting end 112 transports fluid between the tapered insert 111 of the fitting structure 101 and the second pipe structure 122.

The first open end 141 is a first open end 141 of the fitting structure 101. The first open end 141 is formed in the tapered insert 111 of the fitting structure 101. The first open end 141 is a fluid port that allows for fluid to flow into and out of the fitting structure 101. The first open end 141 forms a first congruent end of the composite prism structure of the fitting structure 101. The first open end 141 is the fluid port that forms the fluidic connection between the tapered insert 111 of the fitting structure 101 and the first pipe structure 121. The first open end 141 allows for the exchange of fluid between the first pipe structure 121 and the tapered insert 111.

The second open end 142 is a second open end 142 of the fitting structure 101. The second open end 142 is formed in the fitting end 112 of the fitting structure 101. The second open end 142 is a fluid port that allows for fluid to flow into and out of the fitting structure 101. The second open end 142 forms a second congruent end of the composite prism structure of the fitting structure 101. The second open end 142 is the fluid port that forms the fluidic connection between the fitting end 112 of the fitting structure 101 and the second pipe structure 122. The second open end 142 allows for the exchange of fluid between the second pipe structure 122 and the fitting end 112.

The tapered insert 111 further comprises a plurality of sealing ridges 113. The plurality of sealing ridges 113 are formed on the exterior lateral face of the tapered insert 111. Each sealing ridge selected from the plurality of sealing ridges 113 forms a ring structure that is centered around the center axis of the prism structure of the tapered insert 111. The plurality of sealing ridges 113 are formed at the first open end 141 of the tapered insert 111.

The first pipe structure 121 further comprises a bored aperture 161. The bored aperture 161 is a negative space that is formed through the lateral face of the prism structure of the first pipe structure 121. The bored aperture 161 forms a port between the hollow interior of the first pipe structure 121 and the environment. The bored aperture 161 is geometrically similar to the lateral face of the tapered insert 111 of the fitting structure 101. The bored aperture 161 is sized such that the tapered insert 111 inserts into the bored aperture 161. The bored aperture 161 is further sized such that the tapered insert 111 cannot fully insert through the bored aperture 161. The bored aperture 161 forms a fluid port that interacts with the first open end 141 to form the fluid connection between the tapered insert 111 and the first pipe structure 121.

The first open end 141 of the tapered insert 111 inserts into the bored aperture 161 with a tight fit. The plurality of sealing ridges 113 are formed to apply additional pressure against the perimeter of the bored aperture 162 such that the plurality of sealing ridges 113 forms a fluid impermeable mechanical seal between the tapered insert 111 and the bored aperture 161 of the first pipe structure 121.

The seal structure 103 is a chemical compound. The seal structure 103 forms a chemical seal that is positioned between the first open end 141 of the fitting structure 101 and the bored aperture 161 of the first pipe structure 121 selected from the seal structure 103. The seal structure 103 is a chemical adhesive that permanently secures the lateral face of the tapered insert 111 of the fitting structure 101 to the perimeter of the negative space that forms the bored aperture 161 of the first pipe structure 121. The seal structure 103 forms a fluid impermeable chemical barrier that prevents a fluid from leaking through the seam formed by joining the fitting structure 101 to the first pipe structure 121.

The invention 100 further comprises a threaded connection 104. The threaded connection 104 is a fastening device. The threaded connection 104 is a helical structure. The threaded connection 104 secures the second pipe structure 122 of the plurality of pipe structures 102 to the second open end 142 of the fitting structure 101. The second pipe structure 122 screws into the second open end 142. The threaded connection 104 forms the fluidic connection between the second pipe structure 122 and the second open end 142. The threaded connection 104 forms a fluid impermeable barrier that prevents a fluid from leaking through the seam formed by joining the second pipe structure 122 to the fitting end 112 of the fitting structure 101.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives. See removable adhesive, pressure sensitive adhesive, heat activated adhesive.

Aftermarket Structure: As used in this disclosure, an aftermarket structure refers to a structure that modifies an object after the object has been procured and put into use. The aftermarket structure has a purpose selected from the group consisting of: a) replacing a component or structure of the object for maintenance purposes; and, b) enhancing the function of the object beyond what was provided by the object's original state. The term aftermarket part is a synonym for aftermarket structure.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bifurcate: As used in this disclosure, to bifurcate means to divide an object or space into two pieces or segments.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Fitted: As used in this disclosure, the term fitted refers to two geometrically similar structures wherein the smaller geometrically similar structure inserts into the larger geometrically similar structure.

Fitting: As used in this disclosure, a fitting is a component that attaches a first object to a second object. The fitting is used to form a fluidic connection between the first object and the second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluid Port: As used in this disclosure, a fluid port is an opening formed in an object that allows fluid to flow through the boundary of the object.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Flush: As used in this disclosure, the term flush is used to describe the alignment of a first surface and a second surface to form a single structure selected from the group consisting of a Euclidean plane and a non-Euclidean plane.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Furcate: As used in this disclosure, to furcate or furcation refers to the division of an object into a plurality branches, pieces, spaces, or segments.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Groove: As used in this disclosure, a groove is a negative space that forms a channel or trough.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pipe: As used in this disclosure, a pipe is a hollow cylindrical device that is used for transporting liquids and gases. The line that connects the center of the first base of the cylinder to the center of the second base of the cylinder is referred to as the center axis of the pipe or the centerline of the pipe. In this disclosure, the terms inner diameter of a pipe and outer diameter of a pipe are used as they would be used by those skilled in the plumbing arts.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Ridge: As used in this disclosure, a ridge is a prism shaped structure attaches to a surface such that: a) a span of distance exists between the surface and the center axis of the prism shaped structure; and, b) the center axis of the prism shaped structure is parallel to the surface.

Rounded: A used in this disclosure, the term rounded refers to the replacement of an apex, vertex, or edge or brink of a structure with a (generally smooth) curvature wherein the concave portion of the curvature faces the interior or center of the structure.

Seam: As used in this disclosure, a seam is a joining or attachment of a first surface to a second surface. The first surface and the second surface have a flush alignment when joined.

Screw: As used in this disclosure, to screw is a verb meaning: 1) to fasten or unfasten (unscrew) a threaded connection; or 2) to attach a helical structure to a solid structure.

Seal: As used in this disclosure, a seal is a structure that forms a fluid impermeable barrier between two objects.

Solid: As used in this disclosure, a solid refers to a state (phase) of matter that: 1) has a fixed volume; and, 2) does not flow.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object. Always use major and minor axes.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis. Always use taper.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tight Fit: As used in this disclosure, a tight fit refers to the insertion of a first object into a second object such that there is not a lot of space between the first object and the second object. By not a lot of space is meant that friction occurs when the first object moves within the second object.

Truncated: As used in this disclosure, a geometric object is truncated when an apex, vertex, or end is cut off by a line or plane.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pipe-tapping system comprising
a fitting structure, a plurality of pipe structures, a seal structure, and a threaded connection;
wherein the fitting structure forms the fluidic connections between the plurality of pipe structures;
wherein the seal structure forms fluid impermeable seals between the fitting structure and the plurality of pipe structures;
wherein the threaded connection forms a physical fluidic connection between the fitting structure and the plurality of pipe structures;
wherein the fitting structure comprises a tapered insert, a fitting end, a first open end, and a second open end;
wherein the tapered insert further comprises a plurality of sealing ridges;
wherein the plurality of sealing ridges formed on an exterior lateral face of the tapered insert;
wherein each sealing ridge selected from the plurality of sealing ridges forms a ring structure that is centered around a center axis of a prism structure of the tapered insert;
wherein the plurality of sealing ridges are formed at the first open end of the tapered insert.

2. The pipe-tapping system according to claim 1
wherein the pipe-tapping system is a fitting;
wherein the pipe-tapping system allows for the formation of a fluidic connection between the plurality of pipe structures without requiring the bifurcation of any of the plurality of pipe structures.

3. The pipe-tapping system according to claim 2
wherein each pipe structure selected from the plurality of pipe structures is a pipe;
wherein each pipe structure selected from the plurality of pipe structures is a fluid transport structure;
wherein the plurality of pipe structures comprises the specific pipes that are to be fluidically connected by the fitting structure.

4. The pipe-tapping system according to claim 3
wherein the plurality of pipe structures comprises a first pipe structure and a second pipe structure;
wherein the first pipe structure is the pipe that is selected for the fluidic connection with the second pipe structure;
wherein the second pipe structure is the pipe that is selected for the fluidic connection with the first pipe structure;
wherein the fitting structure forms the fluidic connection between the first pipe structure and the second pipe structure.

5. The pipe-tapping system according to claim 4
wherein the fitting structure is a pipe;
wherein the fitting structure is a fitting;
wherein the fitting structure has a composite structure;
wherein the fitting structure is a hollow structure.

6. The pipe-tapping system according to claim 5
wherein the fitting structure is formed as a single fluid transport structure;
wherein the tapered insert forms a section of the fitting structure;
wherein the fitting end forms the balance of the fitting structure;
wherein the first open end allows for the exchange of fluid between the first pipe structure and the tapered insert;
wherein the second open end allows for the exchange of fluid between the second pipe structure and the fitting end.

7. The pipe-tapping system according to claim 6
wherein the tapered insert is a pipe;
wherein the tapered insert has a tapered structure;
wherein the tapered insert is a fluid transport structure;
wherein the tapered insert is a hollow structure;
wherein the tapered insert transports fluid between the fitting end of the fitting structure and the first pipe structure.

8. The pipe-tapping system according to claim 7
wherein the fitting end is a pipe;
wherein the fitting end is a fluid transport structure;
wherein the fitting end is a hollow structure;
wherein the fitting end transports fluid between the tapered insert of the fitting structure and the second pipe structure.

9. The pipe-tapping system according to claim 8
wherein the first open end is a first open end of the fitting structure;
wherein the first open end is formed in the tapered insert of the fitting structure;
wherein the first open end is a fluid port that allows for fluid to flow into and out of the fitting structure;
wherein the first open end forms a first congruent end of the composite structure of the fitting structure;
wherein the first open end is the fluid port that forms the fluidic connection between the tapered insert of the fitting structure and the first pipe structure.

10. The pipe-tapping system according to claim 9
wherein the second open end is a second open end of the fitting structure;
wherein the second open end is formed in the fitting end of the fitting structure;
wherein the second open end is a fluid port that allows for fluid to flow into and out of the fitting structure;
wherein the second open end forms a second congruent end of the composite structure of the fitting structure;
wherein the second open end is the fluid port that forms the fluidic connection between the fitting end of the fitting structure and the second pipe structure.

11. The pipe-tapping system according to claim 10
wherein the first pipe structure further comprises a bored aperture;
wherein the bored aperture is a negative space that is formed through the lateral face of the first pipe structure;
wherein the bored aperture forms a port between the hollow interior of the first pipe structure and the environment;
wherein the bored aperture is geometrically similar to the lateral face of the tapered insert of the fitting structure;
wherein the bored aperture is sized such that the tapered insert inserts into the bored aperture;
wherein the bored aperture is further sized such that the tapered insert cannot fully insert through the bored aperture;
wherein the bored aperture forms a fluid port that interacts with the first open end to form the fluid connection between the tapered insert and the first pipe structure.

12. The pipe-tapping system according to claim 11
wherein the first open end of the tapered insert inserts into the bored aperture with a tight fit;
wherein the plurality of sealing ridges are formed to apply pressure against the perimeter of the bored aperture such that the plurality of sealing ridges forms a fluid impermeable mechanical seal between the tapered insert and the bored aperture of the first pipe structure.

13. The pipe-tapping system according to claim 12
wherein the seal structure is a chemical compound;
wherein the seal structure forms a chemical seal that is positioned between the first open end of the fitting structure and the bored aperture of the first pipe structure selected from the seal structure;
wherein the seal structure is a chemical adhesive that permanently secures the lateral face of the tapered insert of the fitting structure to the perimeter of the negative space that forms the bored aperture of the first pipe structure;
wherein the seal structure forms a fluid impermeable chemical barrier that prevents a fluid from leaking through a seam formed by joining the fitting structure to the first pipe structure.

14. The pipe-tapping system according to claim 13
wherein the threaded connection is a fastening device;
wherein the threaded connection is a helical structure;
wherein the threaded connection secures the second pipe structure of the plurality of pipe structures to the second open end of the fitting structure;
wherein the second pipe structure screws into the second open end;
wherein the threaded connection forms the fluidic connection between the second pipe structure and the second open end;
wherein the threaded connection forms a fluid impermeable barrier that prevents a fluid from leaking through the seam formed by joining the second pipe structure to the fitting end of the fitting structure.

\* \* \* \* \*